United States Patent [19]

Parish et al.

[11] Patent Number: 5,075,036
[45] Date of Patent: Dec. 24, 1991

[54] CONDUCTIVE POLYIMIDE CONTAINING CARBON BLACK AND GRAPHITE AND PREPARATION THEREOF

[75] Inventors: Darrell J. Parish, Circleville; Morton Katz, Columbus, both of Ohio

[73] Assignee: E. I. Du Pont de Nemours and Company, Wilmington, Del.

[21] Appl. No.: 395,116

[22] Filed: Aug. 16, 1989

[51] Int. Cl.$^5$ ............................................. H01B 1/06
[52] U.S. Cl. ..................................... 252/511; 524/495; 524/496; 428/473.5
[58] Field of Search ................. 252/511; 524/495, 496; 428/408, 411.1, 473.5

[56] References Cited

U.S. PATENT DOCUMENTS

| | | | |
|---|---|---|---|
| 3,923,697 | 12/1975 | Ellis | 252/506 |
| 4,146,668 | 3/1979 | Dorey et al. | 428/283 |
| 4,311,615 | 1/1982 | Taylor et al. | 252/514 |
| 4,568,412 | 2/1986 | Atkins, Jr. et al. | 156/655 |

FOREIGN PATENT DOCUMENTS 708896 5/1965 Canada .

Primary Examiner—Josephine Barr

[57] ABSTRACT

An electrically conductive polyimide article having a polyimide matrix with carbon black and graphite particles uniformly dispersed therein.

11 Claims, No Drawings

CONDUCTIVE POLYIMIDE CONTAINING CARBON BLACK AND GRAPHITE AND PREPARATION THEREOF

BACKGROUND OF THE INVENTION

This invention relates to electrically conductive polyimide compositions and to a process for making such compositions. More specifically, the invention relates to a conductive polyimide composition comprising a uniform mixture of a polyimide matrix and a conductive filler comprising both carbon black and graphite particles, and a process for producing the same.

Conductive polyimides containing carbon particles are well-known in the art. For example, Canadian Patent 708,896 discloses an electrically conductive polyimide composition prepared by blending conductive carbon particles, e.g., carbon blacks, in the precursor polyamide acid; shaping the particle containing polyamide acid into a structure; and then thermally converting the shaped structure into a polyimide containing the carbon particles. Graphite is not used in combination with the carbon black particles, however.

U.S. Pat. No. 4,568,412 to Atkins et al. discloses a surface conductive shaped article consisting of a polyimide matrix containing carbon black or graphite. Surface conductivity of the article is obtained by exposing the surface of the article to an aqueous or alcoholic etchant solution of an alkali metal hydroxide. The etchant removes a surface layer of polyimide thereby increasing the surface conductivity of the article. The patent does not suggest using a combination of carbon black and graphite to improve surface conductivity but, rather, requires a caustic etching step to obtain such an improvement.

In the manufacture of thin polyimide films having thicknesses of less than 10 mils containing conductive carbon black particles, the particles must first be sized to shapes that are small enough so as not to either foul the extrusion equipment or cause excessive surface roughness on the final polyimide film product. Since the manufacture of polyimide films typically proceeds through a polyamide acid precursor solution, it is most convenient to perform this particle classification in the polyamide acid precursor solvent, usually dimethyl acetamide, prior to blending the carbon black particles into the polyamide acid precursor solution. However, polar organic solvents, such as dimethyl acetamide, when used to mill carbon blacks have poor grinding efficiency and promote reagglomeration of the particles thereby causing thickening of the carbon particle solvent slurry. This effect is particularly pronounced with the more highly conductive carbon blacks which generally have large surface areas, ultimate particle sizes in the less than 20 millimicron range and tend to form long and often three dimensional clusters thereby increasing solution viscosity even at low concentrations. Thus, a moderately conductive carbon black having a nominal surface area of 25 m$^2$/g can be milled in dimethyl acetamide at a solids concentration of 18% to provide a polyimide film. Consequently for the final film to have a volume resistivity of 1 ohm-cm, high loadings of carbon black on the order of 25% are required. On the other hand, a highly conductive carbon black having a nominal surface area of 1250 m$^2$/g can be milled only at concentrations of less than 4% solids in dimethyl acetamide and reagglomeration is many times more rapid thereby resulting in slurries of poor quality. Consequently, polyamide acid solutions containing such highly conductive carbon blacks must be diluted to such high levels with the carbon black solvent slurry that the resulting casting dope is difficult to process due to low solution viscosity.

In contrast to carbon blacks which have a millimicron range of ultimate particle size, graphite particles have particle sizes in the micron range. Thus, graphite particles can easily be slurried in dimethyl acetamide, but concentrations needed to provide polyimide films having high conductivity are so large that the resultant films have poor structural integrity.

It has now been found that conductive polyimides containing both carbon black and graphite can be obtained by milling a large surface area, small particle size, highly conductive carbon black with large particle size, hard graphite particles in a polar solvent such as dimethyl acetamide; admixing the milled particle slurry with polyamide acid precursor; and thermally converting the polyamide acid containing the carbon black and graphite particles to polyimide. The resulting polyimide films have excellent electrical conductivity and due to the lower carbon loadings used, are tough and the surfaces are smooth. The use of graphite also increases slurry solids thereby increasing the solution viscosity of the casting dope.

SUMMARY OF THE INVENTION

According to the present invention there is provided an article of electrically conductive polyimide composition, e.g., capable of forming a self-supporting film, comprising a uniform mixture of a polyimide matrix and of a conductive filler comprising carbon black and graphite wherein the article has either a surface resistivity from 130 to $1 \times 10^{10}$ ohms per square or a volume resistivity in a range from 0.33 to $2.5 \times 10^6$ ohm-cm.

The present invention is also directed to producing such article of an electrically conductive polyimide which comprises the steps of (1) milling conductive carbon black with graphite particles in an organic polar solvent for polyamide acid; (2) admixing said milled particle solvent slurry with a polyamide acid derived from reaction of substantially equimolar amounts of at least one dianhydride and at least one diamine in an organic polar solvent; (3) shaping said particle containing polyamide acid into a structure; and (4) converting said shaped structure into a polyimide containing the carbon black and graphite particles uniformly dispersed therein.

The shaped structure such as in the form of a sheet or film preferably has a substantially smooth surface.

DETAILED DESCRIPTION OF THE INVENTION

The polyimide matrix materials used in this invention include any polyimide thermally converted from polyamide acid derived from reaction of a dianhydride and a diamine such as are disclosed in U.S. Pat. Nos. 3,179,630 and 3,179,634, the disclosures of which are hereby incorporated by reference.

The polyamide acids are made by dissolving approximately equimolar amounts of a dianhydride and a diamine in a solvent and agitating the resulting solution under controlled temperature conditions until polymerization of the dianhydride and the diamine is completed.

Suitable dianhydrides for use in the polyimides include:

pyromellitic dianhydride;
2,3,6,7-naphthalene tetracarboxylic dianhydride;
3,3',4,4'-biphenyl tetracarboxylic dianhydride;
1,2,5,6-naphthalene tetracarboxylic dianhydride;
2,2'3,3'-biphenyl tetracarboxylic dianhydride;
3,3'4,4'-benzophenone tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
oxydiphthalic dianhydride;
bis(3,4-dicarboxyphenyl) sulfone dianhydride; and the like.

Suitable diamines for use in the polyimides include:
4,4'-diaminodiphenyl propane; 4,4'-diamino diphenyl methane; benzidine; 3,3'-dichlorobenzidine;
4,4'-diamino diphenyl sulfide; 3,3'-diamino diphenyl sulfone; 4,4'-diamino diphenyl sulfone; 4,4'-diamino diphenyl ether; 1,5-diamino naphthalene; 4,4'-diamino diphenyl diethylsilane; 4,4'-diamino diphenysilane;
4,4'-diamino diphenyl ethyl phosphine oxide;
4,4'-diamino diphenyl N-methyl amine; 4,4'-diamino diphenyl N-phenyl amine; 1,4-diaminobenzene (p-phenylene diamine); 1,3-diaminobenzene;
1,2-diaminobenzene; and the like.

The preferred polyimide used in this invention is derived from 4,4'-diaminodiphenyl ether and pyromellitic dianhydride.

Copolyimides derived from any of the above diamines and dianhydrides are also operable. Particularly preferred copolyimides are those derived from 15 to 85 mole % of biphenyltetracarboxylic dianhydride, 15 to 85 mole % pyromellitic dianhydride, 30 to 100 mole % p-phenylenediamine and 0 to 70 mole % of 4,4'-diaminodiphenyl ether. Such copolyimides are described in U.S. Pat. No. 4,778,872 which disclosure is also incorporated herein by reference.

The solvent must dissolve one or both of the polymerizing reactants and, preferably, will dissolve the polyamic acid polymerization product. The solvent must, of course, be substantially unreactive with all of the polymerizing reactants and with the polyamic acid polymerization product.

Preferred solvents include normally liquid N,N-dialkylcarboxylamides, generally. Preferred ones of those solvents include the lower molecular weight members of such carboxylamides, particularly N,N-dimethylformamide and N,N-diethylacetamide. Other useful compounds of this class of solvents are N,N-diethylformamide and N,N-diethylacetamide. Other solvents which may be used are diamethylsulfoxide, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid, since this concentration has been found to give optimum molecular weight.

The polyamic acid solutions are generally made by dissolving the diamine in a dry solvent and slowly adding the dianhydride under conditions of agitation and controlled temperature in an inert atmosphere. The diamine is conveniently present as a 5 to 15 weight percent solution in the solvent and the diamine and dianhydride are usually used in about equimolar amounts.

The electrically conductive polyimide compositions of the present invention contain a blend of both carbon black and graphite particles. Such compositions can range from highly conductive materials such as having a surface resistivity in a range from 130 to 2000 ohms per square or a volume resistivity in a range from 0.33 to 5.07 ohm-cm to a composition having enough electrical conductivity to bleed off unwanted antistatic electrical charges and having a surface resistivity in a range from $10^5$ to $10^{10}$ ohms per square or a volume resistivity from 250 to $2.5 \times 10^6$ ohm-cm. Commercial conductive carbon blacks are suitable for use herein.

In the present invention the starting carbon black particles will be larger than after a milling process with the graphite particles. The starting carbon black agglomerate particle size is not critical but generally substantially all particles will be less than 5 microns, more preferably less than 3 microns, and most preferably less than 1 micron. To obtain a substantially smooth surface in the final polyimide composition at least 75% of the particles will not be greater than 0.41 microns and will range from 0.25 to 0.41 microns. More preferably, 90% of the particles will have such particle size and, most preferably, substantially all particles will have such size limitation.

Suitable carbon blacks include, among others, acetylene blacks, super abrasion furnace blacks, conductive furnace blacks, conducting channel blacks and fine thermal blacks. A preferred carbon black is "Printex" XE-2, supplied by Degussa Chemical Co.

The graphite can be synthetic or natural. Due to their lamellar crystallite structure, synthetic graphites have higher conductivity than natural graphites and are preferred. In similar fashion as the carbon black particles, the additional particles of graphite will be larger prior to a milling operation wherein such particles, undergo a reduction in size. The size of the starting graphite particles is not critical but generally substantially all particles will have the same particle size limitations as described in reference to the carbon black particles, i.e., substantially all particles will be less than 5 microns, more preferably less than 3 microns and, most preferably, less than 1 micron. As with the carbon black particles in order to obtain a substantially smooth polyimide surface at least 75% of the graphite particles will not be greater in size than 0.41 micron and will range from 0.25 to 0.41 micron. More preferably, at least 90% of the particles will have such particle size and, most preferably, substantially all particles will have such size limitation. The good lubricating properties of the graphite facilitates the thoroughness and homogeneity of mixing without significant loss of conductivity. A preferred graphite is HPN-5, supplied by the Dixon Chemical Company.

The ratio of the carbon black and the graphite used herein can vary from 15 to 85 weight % carbon black and from 85 to 15 weight % graphite. The ratio and the amounts of such particulate materials will be dependent on the conductive properties desired in the final article. Particularly preferred herein is a ratio of 70 weight % carbon black and 30 weight % graphite which provides outstanding results as described hereinafter. The total amount of carbon black and graphite used in the invention polyimide compositions ranges from 6 to 25% by weight based on the final filled polyimide composition.

From 6 to 10 weight % of carbon black and graphite is preferred for use in the antistatic, low conductivity filled polyimide compositions and from 15 to 25 weight % is preferred in the highly conductive filled polyimide compositions.

The conductive polyimide compositions of this invention are prepared by first dispersing the carbon black and graphite particles in a medium comprising an organic polar solvent, preferably dimethyl acetamide. Typically a mill is employed with the materials at room temperature. After milling a typical temperature is in a range from 45° to 58° C. such temperature is not critical but to maintain a reduced temperature the walls of the mill can be jacketed and cooled. The milling process provides a slurry containing the carbon black and graphite particles uniformly dispersed in the polymerization medium.

The slurry preparing step is followed by admixing the slurry with a polymerization product solution comprising a polyamide acid derived from the reaction of a tetracarboxylic acid dianhydride with a diamine in an additional amount of the polymerization medium, preferably at a temperature of 100° C. or less, more preferably 0° to 60° C. to provide an admixture wherein the carbon black and graphite particles are uniformly dispersed in the polyamide acid polymerization product solution.

Optionally, an additional amount of the polymerization medium is added to the admixture to control the rotation viscosity to a desired level, a release agent is added or the admixture is defoamed. However an additive is not essential in the present invention. The resultant dope consists of a solution of the polyamide acid polymerization product and the carbon black and graphite particles uniformly dispersed in the solution.

The dope is subjected to shaped article producing procedures. For example, the dope is converted to a thin layer by a conventional film-forming process. The dope is spread on a flat surface of a substrate, for example, a glass plate or metal plate, a curved surface of a substrate, for example, a peripheral surface of a metal drum, or a flat or curved surface of an endless metal belt, to form a thin film layer of the dope having an even thickness. The dope can also be molded in a mold having a desired shape.

The shaped dope is gradually dried, preferably at a temperature of about 50° to 200° C., more preferably 60° to 180° C., by evaporating the organic solvent polymerization medium. The resultant shaped solid article contains a small amount of the polymerization medium. The shaped article is heated at a high temperature of from about 200° C. to 500° C., preferably from 250° C. to 450° C. to completely dry and completely convert the polyamide acid in the shaped article to the corresponding polyimide polymer.

Although thermal conversion of the polyamide acid to the polyimide is preferred, it is within the scope of the present invention that chemical conversion as is well known in the art can likewise be employed.

A preferred dope is prepared by admixing a carbon black-graphite dispersed slurry with a polyamide acid polymerization product derived from at least 60 mole % of pyromellitic dianhydride and from at least 30 mole % of 4,4'-diaminodiphenyl ether, dissolved in an organic polar solvent and subjecting the resulting admixture to a temperature of 250° C. to 450° C. for a sufficient time to completely convert the polyamide acid to polyimide.

In the process of the present invention, the dope preferably contains the polyamide acid polymerization product in an amount of from about 7% to 28% by weight, most preferably 15% to 17% by weight, and has a rotation viscosity of about 160 to 5,000 poises, most preferably from 2500 to 3500 poises. This type of dope can be easily shaped, for example, into a thin film layer.

A suitably shaped article is in the form of a film or sheet preferably having a thickness of 5 to 200 micrometers, more preferably 10 to 150 micrometers. The preferred film or sheet has excellent flexibility and surface smoothness.

Even though the polyimide matrix of the article contains particulate carbon black and graphite, the surface of the article remains exceptionally smooth, as evidenced by a surface roughness (Ra) of less than 0.20 micron as measured using a Talysurf profilometer.

In the following examples all parts and percentages are by weight unless otherwise included.

EXAMPLE 1

A 0.94 mil thick conductive polyimide film containing 16.1% of carbon black graphite particles was prepared as follows:

"Printex" XE-2 carbon black (70 g) and 30 g of HPN-5 graphite were uniformly dispersed in 2000 g of dimethyl acetamide at room temperature for thirty minutes in a commercial Kady mill to provide a slurry. In order to stabilize the slurry against reagglomeration, 180 g of an 11% polyamide acid solution containing equimolar amounts of pyromellitic dianhydride (PMDA) and 4,4'-diaminodiphenyl ether (ODA) in dimethyl acetamide were added. The stabilized slurry was milled for an additional eight minutes to effect thorough wetting of the carbon-graphite particles with the polyamide acid.

From the resultant stabilized carbon-graphite slurry (95 g) was added to 100 g of a 20.3% solution of polyamide acid of pyromellitic dianhydride and 4,4'-diaminodiphenyl ether in dimethyl acetamide. Stirring was continued for 30 minutes to ensure thorough blending. The Brookfield viscosity was 590 poises at 25° C. A 6% solution of PMDA in dimethyl acetamide was added to titrate the dianhydride to stoichiometric equivalence with the diamine. The resultant casting dope had a Brookfield solution viscosity of 942 poises at 25° C.

The dope was deaerated at room temperature for 18 to 20 hours and was extruded in the form of a thin film onto a "Pyrex" glass plate using a coating rod gapped to provide a 1 mil thick cured film. The thin film shaped dope was heated at 107°–112° C. for thirty minutes to allow the solvent to gradually evaporate. The resultant solidified film contained about 25% residual dimethyl acetamide solvent.

The solidified film was clamped into a frame (for restraint) and heated in a vented, air circulating oven for 30 minutes at 325° C. to completely convert the polyamide acid to polyimide.

The resultant polyimide film had a thickness of 0.94 mil and contained 16.1% of carbon-graphite filler particles uniformly dispersed int he polyimide matrix. The ratio of carbon black to graphite particles was 70% to 30% by weight.

The film had a surface resistivity of 422 ohms/square (as measured with a commercially available VEECO four-point probe instrument), a calculated volume resistivity of 1.01 ohm-cm and a Talysurf surface roughness ($R_a$) of 0.11 micron.

Surface roughness was measured using a commercial Talysurf profilometer by measuring the centerline average ($R_a$ in microns) of the vertical deflection of the stylus moving horizontally over the surface of the film.

COMPARATIVE EXAMPLE 1

A conductive polyimide film was prepared as described in Example 1 except that graphite was not included in the carbon filled composition.

"Printex" XE-2 carbon black (64 g) was slurried in 2000 g of dimethyl acetamide for 30 minutes at room temperature. The slurry was stabilized by addition of 230 g of an 11% polyamide acid solution of PMDA and 4,4'-diaminodiphenyl ether in dimethylacetaminde.

A casting dope was prepared by adding 120 g of the stabilized carbon black slurry to 100 g of a 20.3% polyamide acid solution of PMDA and 4,4'-diaminodiphenyl ether in dimethylacetamide. The Brookfield viscosity of the dope was 166 poises. After titration to stoichiometric equivalence with a 6% PMDA solution in dimethylacetamide, the viscosity of the dope increased to 326 poises.

A nominal 1 mil film was cast and cured at 325° C. for 30 minutes.

The final polyimide film had a thickness of 0.84 mil and contained 14.4% of carbon black particles (no graphite). The film had a surface resistivity of 539 ohms/square, a calculated volume resistivity of 1.14 ohm-cm and a $R_a$ surface roughness of 0.62 micron.

A comparison of Example 1 and Comparative Example 1 shows that the maximum millable concentration of the carbon-graphite slurry was 4.7% as compared to only 3.1% for the carbon black slurry. Thus, the invention process increases the overall solids as well as the solution viscosity of the casting dope. This is a significant advantage when preparing such conductive polyimides on a commercial scale.

Surprisingly, although the carbon-graphite filled film is more highly carbon pigmented than the carbon black film, 16.1% as compared to 14.4%, it is markedly smoother as indicated by the lower surface roughness as measured by the Talysurf profilometer. The carbon black-graphite filled film also has lower surface resistivity than the carbon black filled film, which is surprising, since a lower amount of the highly conductive carbon black is present in the carbon black-graphite filled film (11.3%) as compared to the carbon black filled film (14.4%).

For control purposes, a graphite slurry consisting of 55 g HPN-5 graphite and 385 ml dimethyl acetamide were milled for 15 minutes in a Kady mill. Casting dopes were prepared using PMDA-ODA polyamide acid solution. Using the thermal conversion curing process, 1 mil thick films were prepared that contained 22.25 and 28.1% graphite. The resultant surface resistivities were 7,100 and 715 ohms/square, respectively.

EXAMPLE 2

A blend of 70% by weight "Printex" XE-2 carbon black and 30% by weight HPN-5 graphite was milled at 4.7% solids in dimethylacetamide in a Kady mill at room temperature for 30 minutes.

Five casting dopes were prepared by admixing varying proportions of the slurry with a 20.3% polyamide acid solution of PMDA and 4,4'-diaminodiphenyl ether in dimethylacetamide as described in Example 1.

The following volume resistivities were determined for five different carbon loadings in the final polyimide film.

| Weight % "Printex" XE-2/Graphite | Volume Resistivity (ohm-cm) |
|---|---|
| 15.1 | 1.32 |
| 16.0 | 1.06 |
| 17.6 | 0.80 |
| 19.2 | 0.54 |
| 22.2 | 0.35 |

From the above results, it can be seen that a highly conductive 1 ohm-cm film can be obtained using about a 16% loading of carbon black and graphite.

EXAMPLE 3

Forty pounds of "Printex" XE-2 carbon black, 17 pounds of HPN-5 graphite and 160 gallons of dimethylacetamide were milled in a commercial size Kady mill at about 55° C. for 30 minutes. The maximum particle size of the milled slurry was less than one micron.

Eighty pounds of an 11% polyamide acid solution of pyromellitic dianhydride and 4,4'-diaminodiphenyl ether in dimethyl acetamide were added to stabilize the slurry against reagglomeration.

The stabilized slurry was blended into a 20.3% polyamide acid solution of PMDA and 4,4'-diaminodiphenyl ether in dimethylacetamide. The casting dope was titrated with a 6% solution of PMDA in dimethylacetamide to obtain stoichiometric equivalence with the diamine. The initial viscosity of the casting dope was 160 poises and after titration increased to 600 poises. Triphenyl phosphite (2% by weight) was blended into the polymer slurry to effect release from the casting surface and to sequester metallic impurities that might be harmful to the oxidative resistance of the film.

The dope was extruded through a slit die onto an endless metal belt and heated at 90° to 135° C. to reduce the solvent content to about 30%.

The resultant solidified film was subsequently heated in a combination convective and radiant heat tenter oven at 380° C.

The final polyimide film had a thickness of 1.32 mils, contained 16.9% of a 70/30 blend of carbon black and graphite and had a surface resistivity of 540 ohms/square and an air/belt surface roughness ($R_a$) of 0.17/0.12 micron.

The film had a density of 1.4577 g/cc, tensile strength of 18 Kpsi and ultimate elongation of 25%.

EXAMPLE 4

Six conductive, antistatic polyimide films were prepared as described in Example 1 containing from 6.27% to 7.65% of carbon black and graphite and varying in surface resistivity from $10^5$ to $10^9$ ohms/square.

A slurry was prepared by milling a blend of 35 g of "Printex" XE-2 and 15 g of HPN-5 graphite in 1000 g of dimethylacetamide for 25 minutes. The particle size of the slurry was less than 1 micron.

Casting dopes were prepared by admixing the following amounts of slurry with 100 g portions of a 20.3% polyamide acid solution containing equimolar amounts of pyromellitic dianhydride and 4,4'-diaminodiphenylether in dimethylacetamide.

One mil thick films were prepared using the thermal conversion process as described in Example 1 and had the following surface resistivities.

| Weight (g) Carbon black/ graphite slurry | Weight % Carbon black/ graphite in film | Surface Resistivity (ohms/square) |
|---|---|---|
| 26.25 | 6.27 | $1.0 \times 10^9$ |
| 26.5 | 6.33 | $8.5 \times 10^7$ |
| 27.0 | 6.44 | $4.8 \times 10^6$ |
| 28.0 | 6.66 | $1.1 \times 10^6$ |
| 30.0 | 7.10 | $1.58 \times 10^5$ |
| 32.5 | 7.65 | $0.65 \times 10^5$ |

What is claimed is:

1. An article comprising a polyimide matrix and a conductive filler uniformly dispersed therein with the filler comprising carbon black and graphite particles wherein
    (a) the article has either a surface resistivity in a range from 130 to $1 \times 10^{10}$ ohms per square or a volume resistivity in a range from 0.33 to $2.5 \times 10^6$ ohm-cm,
    (b) a ratio of carbon black and graphite ranges from 15 to 85 weight % carbon black and from 85 to 15 weight % graphite and
    (c) at least 75% of the graphite particles and at least 75% of the carbon black particles have a particle size within a range from 0.25 to 0.41 micron.

2. The article of claim 1 having a centerline average ($R_a$) surface roughness of less than 0.20 micron.

3. The article of claim 1 wherein at least 90% of the carbon black and graphite particles are within said particle size range.

4. The article of claim 3 wherein substantially all of the carbon black and graphite particles are within said particle size range.

5. The article of claim 1 wherein the surface resistivity is in a range of from 130 to 2000 ohms per square or a volume resistivity in a range of from 0.33 to 5.07 ohm-cm.

6. The article of claim 1 wherein the surface resistivity is in a range of from $10^5$ to $10^{10}$ ohms per square or a volume resistivity in a range of from 250 to $2.5 \times 10^6$ ohm-cm.

7. The article of claim 1 having a ratio of 70 weight % carbon black and 30 weight % graphite.

8. The article of claim 1 wherein the total amount of carbon black and graphite ranges from 6 to 25 weight %.

9. The article of claim 1 in the form of a film.

10. The article of claim 9 in the form of a film having a thickness of from 5 to 200 microns.

11. The article of claim 10 in the form of film having a thickness of from 10 to 150 microns.

* * * * *